US008652600B2

(12) United States Patent
Gallstedt et al.

(10) Patent No.: US 8,652,600 B2
(45) Date of Patent: Feb. 18, 2014

(54) PROTEIN-BASED MATERIAL WITH IMPROVED MECHANICAL AND BARRIER PROPERTIES

(75) Inventors: Mikael Gallstedt, Stockholm (SE); Henrik Ullsten, Karlstad (SE); Eva Johansson, Veberod (SE); Mikael Hedenqvist, Saltsjobaden (SE)

(73) Assignee: Lantmannen Ek For, Stockholm (SE)

( * ) Notice: Subject to any disclaimer, the term of this patent is extended or adjusted under 35 U.S.C. 154(b) by 146 days.

(21) Appl. No.: 13/119,158

(22) PCT Filed: Sep. 15, 2009

(86) PCT No.: PCT/SE2009/051028
§ 371 (c)(1),
(2), (4) Date: May 4, 2011

(87) PCT Pub. No.: WO2010/030234
PCT Pub. Date: Mar. 18, 2010

(65) Prior Publication Data
US 2011/0207915 A1    Aug. 25, 2011

Related U.S. Application Data

(60) Provisional application No. 61/097,016, filed on Sep. 15, 2008.

(51) Int. Cl.
| | |
|---|---|
| *A22C 13/00* | (2006.01) |
| *A23J 3/00* | (2006.01) |
| *A23J 3/18* | (2006.01) |
| *A23L 1/00* | (2006.01) |
| *A23P 1/08* | (2006.01) |

(52) U.S. Cl.
USPC ........ 428/34.8; 428/35.2; 428/35.7; 428/481; 428/516

(58) Field of Classification Search
None
See application file for complete search history.

(56) References Cited

U.S. PATENT DOCUMENTS

| | | | |
|---|---|---|---|
| 3,615,715 A | 10/1971 | Mullen | |
| 5,665,152 A | 9/1997 | Bassi et al. | |
| 5,772,721 A * | 6/1998 | Kazemzadeh | .................... 71/11 |
| 2005/0287267 A1 | 12/2005 | Maningat et al. | |

FOREIGN PATENT DOCUMENTS

| | | |
|---|---|---|
| DE | 102004011231 A1 | 8/2005 |
| GB | 1261299 A | 1/1972 |

OTHER PUBLICATIONS

Maningat et al. (Research Department Technical Bulletin, 1994, vol. XVI, Issue 6, pp. 1-8).*
Aithani, D. and Mohanthy, A.K. 2006 "Value-Added New Materials from Byproduct of Corn Based Ethanol Industries: Blends of Plasticized Corn Gluten Meal and Poly($\epsilon$-caprolactone)" *Ind. Eng. Chem. Res* 45:6147-6152.
Bräuer, S. et al. 2007 "Preparation and Thermoplastic Processing of Modified Plant Proteins" *Macromolecular Science and Engineering* 292:176-183.
Hernandez-Izquierdo, V.M. and Krochta, J.M. 2008 "Thermoplastic Processing of Proteins for Film Formation—A Review" *Journal of Food Science* 73(2):R30-R39.
Hochstetter, A. et al. 2006 "Properties of gluten-based sheet produced by twin-screw extruder" *LWT* 39:893-901.
Lindsay, M.P. And Skerritt, J.H. 1999 "The glutenin macropolymer of wheat flour doughs: structure-function perspectives" *Trends in Food Science and Technology* 10:247-253.
Micard, V. et al. 2001 "Thermal properties of raw and processed wheat gluten in relation with protein aggregation" *Polymer* 42:477-485.
Ullsten, N.H. et al. 2006 "Enlarged Processing Window of Plasticized Wheat Gluten Using Salicylic Acid" *Biomacromolecules* 7:771-776.
Ullsten, N.H. et al. 2009 "Properties of Extruded Vital Wheat Gluten Sheets with Sodium Hydroxide and Salicyclic Acid" *Biomacromolecules* 10:479-488.

* cited by examiner

*Primary Examiner* — Suzanne M Noakes
*Assistant Examiner* — Jae W Lee
(74) *Attorney, Agent, or Firm* — Knobbe, Martens, Olson & Bear, LLP

(57) ABSTRACT

The invention relates to a method of producing an extrudate comprising the steps of providing a plant protein and treating said protein with a solution comprising a nitrogen-containing compound. The solution with the nitrogen-containing compound may moreover comprise an anti-oxidative acid. A product, such as a film, obtained by the method is also described. By using the solvent-free method of the invention, polymers with excellent barrier and tensile properties may be produced.

5 Claims, 5 Drawing Sheets

PROTEIN-BASED MATERIAL WITH IMPROVED MECHANICAL AND BARRIER PROPERTIES

RELATED APPLICATIONS

This application is a U.S. National Phase of International Application No.: PCT/SE2009/051028, filed Sep. 15, 2009, designating the U.S. and published in English on Mar. 18, 2010 as WO 2010/030234 A1, which claims the benefit of U.S. Provisional Application No. 61/097,016, filed Sep. 15, 2008.

FIELD OF INVENTION

The current invention relates to the field of processing plant proteins for the formation of an extrudate, and in particular to the processing of plant proteins for the manufacture of a non-porous extrudate, such as a film or sheet.

BACKGROUND

The worldwide interest in high performance extruded materials of renewable origin is increasing due to an accelerating demand of environmentally friendly materials for industrial use and also due to the depletion of petroleum resources. Wheat gluten (WG) is one of the candidates contemplated to replace petroleum-based oxygen-barrier polymers for packaging applications. It is a low-cost by-product, from the increasing bio-fuel (ethanol) production, and WG films generally show low oxygen permeability at dry conditions, due to a high content of hydrogen bonds.

The extrudate quality of WG films depends on several parameters that can be controlled to various extents, including applied mechanical energy, shear impact, applied pressure, plasticizer type and content, processing time and temperature. These parameters influence conformational changes, chemical crosslinking and protein aggregation that occur during processing. Sulfhydryl, on the cystein amino acid, is responsible for the creation of disulfide crosslinks during oxidation. An important part of the protein aggregation is a reorganization of the intramolecular disulfide bonds to intermolecular disulfide bonds via thiol-disulfide exchange reactions. The process-induced increase in molar mass, number of chain entanglements and decrease in solubility have been reported in a number of papers.

The processing temperature is one of the main factors that control the protein thiol-disulfide exchange reactions. The upper processing temperature, related to the onset of aggregation, can be increased through limitation of the amount of disulfide-crosslink reactions taking place. It has been shown that it is possible to increase the extrusion temperature using salicylic acid, possibly by reducing and/or delaying disulfide crosslinking through radical scavenging.[1] For solution cast systems, pH is also well known to affect film forming properties. As an example, at pH 7.5, which is close to the WG isoelectric point, it is difficult to produce films. Generally, WG films obtained at pH 2-4 and pH 9-13 are relatively homogenous, while at pH 5-6 they are of poor quality and at pH 7-8 they do not form at all.

For optimal strength and barrier properties, and to obtain desired transparent/translucent properties, as the case may be, the film extrudates have to be homogenous, such that protein particles readily fuse together.

Continuous processing of a plant protein, such as wheat gluten, is difficult without the use of solvents, and often yields a grainy-type of extrudate with inferior mechanical and barrier properties. The use of solvents necessitates an energy-consuming drying step, and renders high temperatures in the extruder impossible. Consequently, there exists a need for an improved process for manufacturing extrudates based on plant protein(s).

DESCRIPTION OF THE INVENTION

The present invention is based on the possibility of improving the polymerisation behaviour of a plant protein, by providing an extrudate comprising a plant protein and a nitrogen-containing compound. The extrudate according to the invention, when extruded, results in a product with e.g. improved tensile strength and oxygen barrier properties (e.g. oxygen permeability<4 $(mm*ml)//m^2 24\ h))$.

The alkaline nitrogen-containing compound forces plant proteins into extensive protein aggregation when extruding films, due to the high pH. This positively influences the homogeneity, such as low porosity, and quality of the extruded polymer.

It may however be advantageous to balance the extensive aggregation. Balancing of the aggregation aims at preventing the disruption and hardening of the dough. Balancing may be carried out by including an anti-oxidative and/or radical scavenging compound in the extrudate.

In the final extrusion step, used for the extrudate in accordance with the current invention, conventional continuously-working plastic processing equipment may be utilized to produce an extrudate based on the plant protein. The polymer produced has, when formed into a film, significantly better oxygen barrier characteristics and film strength than e.g. conventional plasticized wheat gluten based materials. In fact, the polymers formed have barrier and tensile properties comparable with state-of-the-art petroleum-based plastics (table 1). Moreover, a film according to the invention has considerably lowered solubility of proteins therein. The extruder to be used is chosen based on the specific plant protein being extruded. The choice of extruder is well within the competence of the person skilled in the art.

The method according to the current invention does not rely on the use of solvents. Thus, pH of the various process steps is difficult to measure.

In one embodiment, the plant protein is chosen from any one, or a combination of wheat, corn and soy. Wheat gluten and/or corn gluten may be made use of.

The nitrogen-containing compound may be an amino-containing compound. In one embodiment of the invention, the nitrogen-containing compound is chosen from any one, or a combination of ammonium hydroxide, ammonia, quaternary ammonium salts, urea, salmiak, diethanolamine, and triethanolamine.

In yet an embodiment of the invention, the anti-oxidative or radical scavenging compound is chosen from any one of, or a combination of salicylic acid, hindered phenols, amines, vitamins, scorch retarding compounds, other radical scavengers and antioxidants.

Final aspects of the invention relate to products obtained by the method as described herein and use of said method for the production of a film with barrier properties.

The person skilled in the art realizes that the examples and specific embodiments provided herein are merely intended to disclose the spirit and scope of the current invention in accordance with the appended claims, and shall not be seen as any limitation whatsoever.

SHORT DESCRIPTION OF THE FIGURES

Figure 5:
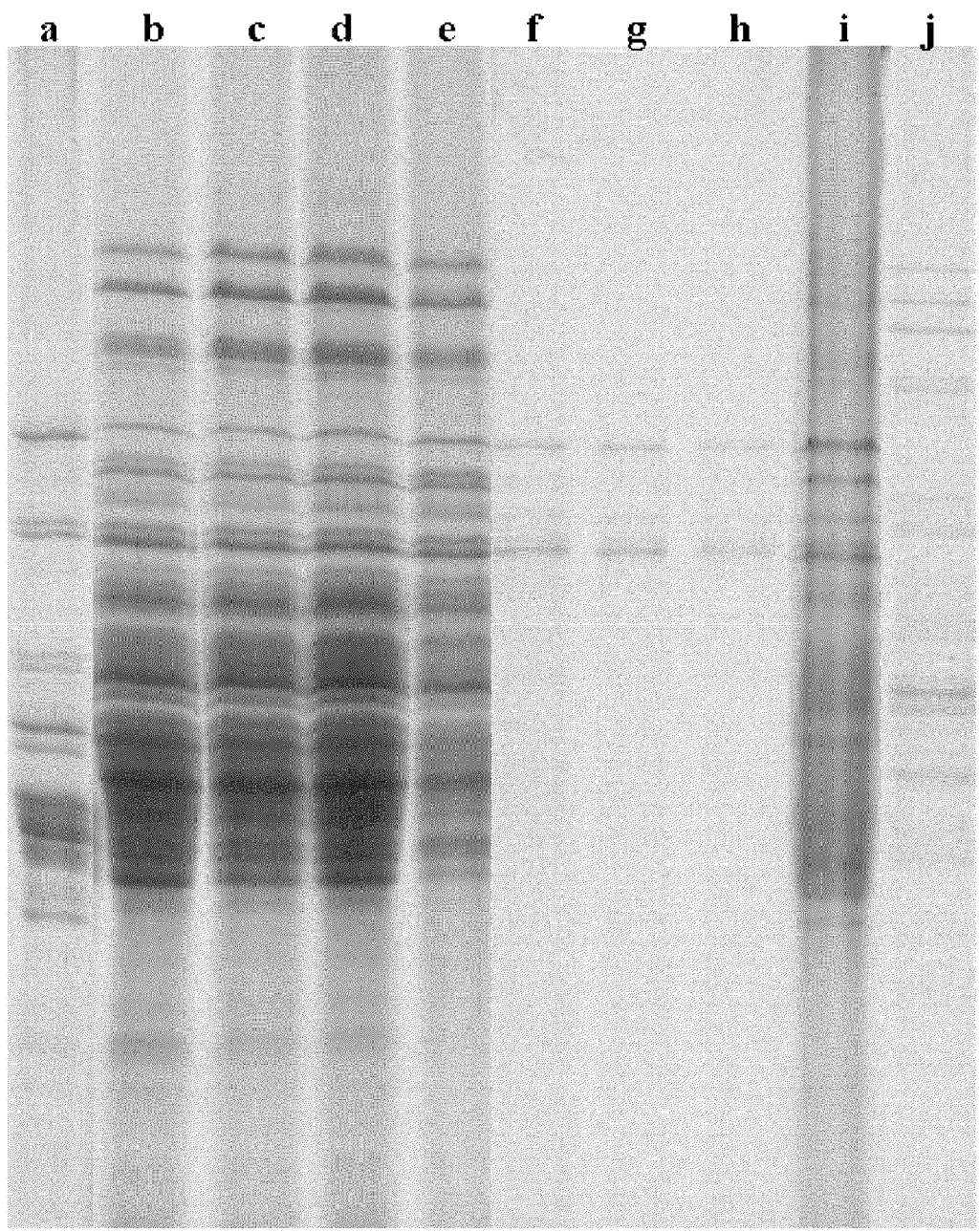

FIG. 5. depicts SDS-PAGE gels of a) Standard gliadins (Courtot), b-e) WG, f-i) AH10, b,f)=proteins extractable in the different WG's with extraction buffer (1) 0.5% SDS-phosphate buffer, c,g)=proteins extractable in the different materials with extraction buffer (2) 0.5% SDS-phosphate buffer, sonicated for 30 s, d, h)=proteins extractable in the different materials with extraction buffer (3) 0.5% SDS-phosphate buffer, sonicated for 3×30 s, e, i)=proteins extractable in the different materials with extraction buffer (4) 6 M Urea+ 0.5% SDS+1% DTT. For the AH's, only omega gliadins were extractable when SDS-phosphate buffer end sonication was used (lane f-h). For extraction of the rest of the proteins from the ammonium-hydroxide WG, urea and DTT are needed.

EXAMPLES

Wheat Gluten

Figure 1:
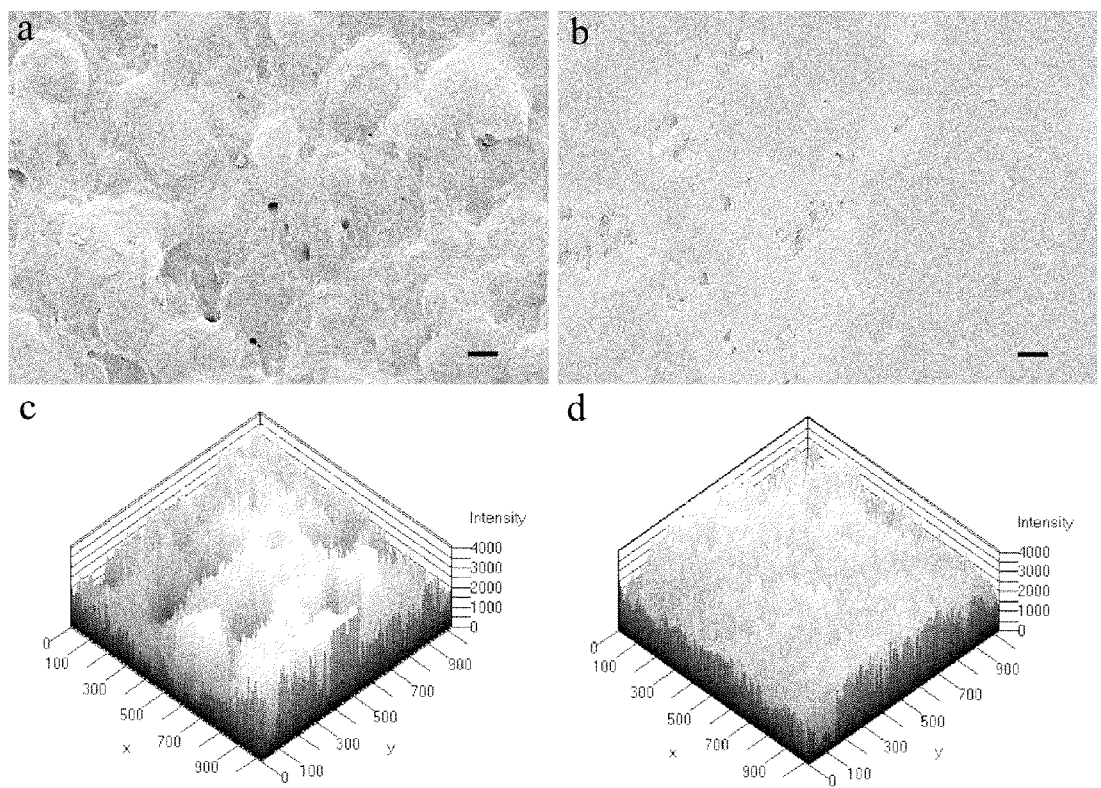
FIG. 1 depicts (a) the surface topography of the WG material; the scale bar is 50 μm; (b) the surface topography of a sample of WG with an ammonium hydroxide addition. Lines on the picture are marks from the extruder; the scale bar is 50 µm; (c) rhodamine intensity diagram of the labeled WG sample and (d) rhodamine intensity diagram of the labeled sample of WG with an ammonium hydroxide addition.
Figure 2:
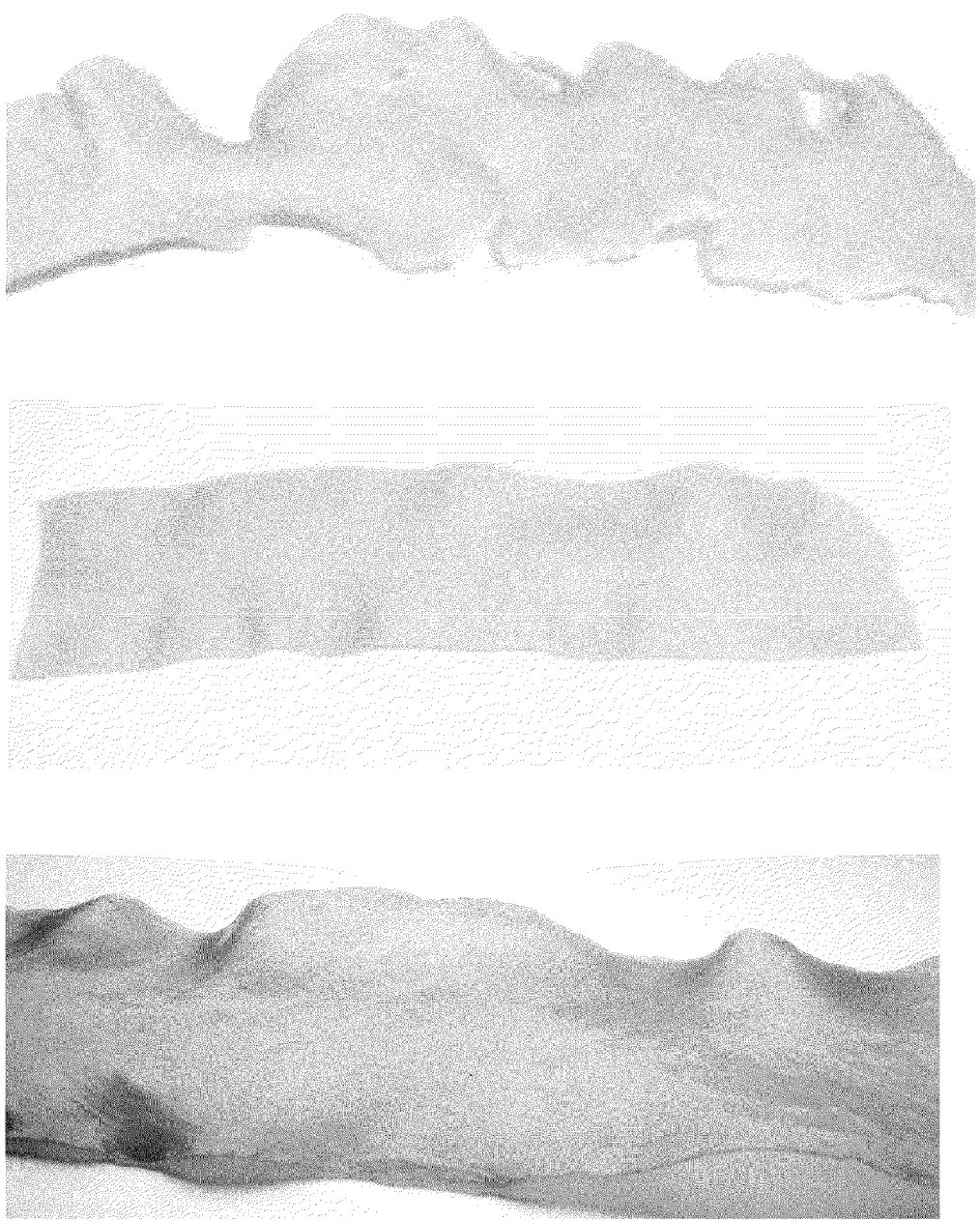
FIG. 2 depicts WG films produced with gluten and glycerol (top), with salicylic acid added (middle) and also with ammonium hydroxide (bottom).
Figure 3:
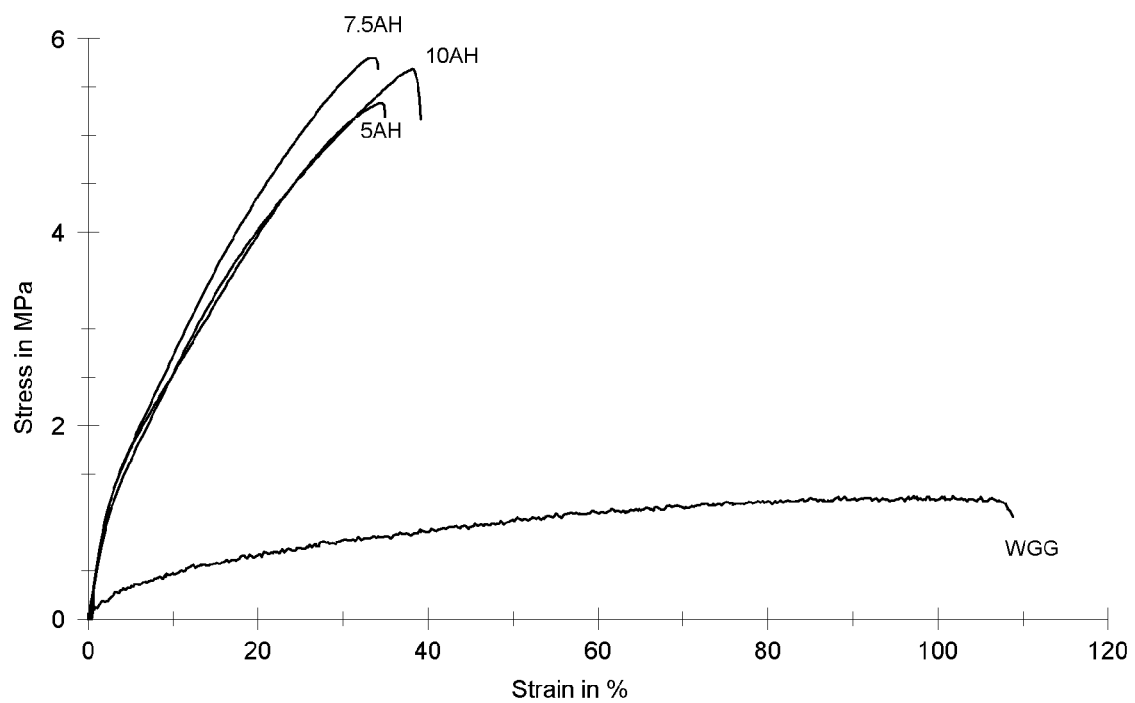
FIG. 3 depicts. stress-strain curves of extrudates of gluten based samples with ca. 9 wt % ("10AH"), ca. 6.9 wt % ("7.5AH"), 4.7 wt % ("5AH") and 0 wt % ("WGG") of ammonium hydroxide. Wt % is calculated on the total amount mass of the sample.

By the addition of ammonium hydroxide to control polymerisation, the extruded WG films had a significantly better quality than WG films extruded without ammonium hydroxide. Scanning electron microscopy (SEM) revealed that conventional WG films, containing only gluten and glycerol, were inhomogeneous, contained numerous voids/bubbles and/or unfused particles (FIG. 1a). Confocal microscopy, labelling the gluten proteins with rhodamin, also clearly showed the unevenness of the proteins in the pure gluten-glycerol sample (FIG. 1b). The bubbles/particles, appearing black in the confocal microscope, were most likely not containing gluten, being starch rich or empty space. Whereas the WG films were grainy with an opaque appearance,[2-6] our ammonium-hydroxide containing films were translucent (FIGS. 1b and 2). The surface was considerably smoother and showed greater homogeneity as compared to all our previously extruded WG films, indicating a readily fused material.[1,6] An interesting feature was that the addition of ammonium hydroxide lowered the extrusion rate, probably due a higher protein viscosity associated with an extensive aggregation inside the extruder. Nevertheless, the extensive aggregation yielded strong and stiff films; the strength of the WG films increased with more than 300% when ammonium hydroxide was used (FIG. 3). Yet these films were not brittle.

The oxygen permeability was low for the ammonium-hydroxide WG films (Table 1). In fact it was below 1% of the corresponding values of WG extrudates containing only gluten and glycerol. Similar low WG-extrudate oxygen permeability values were observed with the addition of NaOH.[6] The variation in oxygen permeability within the same sample (Table 1) was most likely due to the fact that a small amount of voids were still present (FIG. 1b). It is likely that with a screw and a die optimised for the specific WG material, the ammonium hydroxide containing extrudates would contain even a smaller amount of voids and, in addition, the extrusion rate would be higher.

TABLE 1

Oxygen permeability (three replicates (1, 2 and 3) of each sample).

| Oxygen Permeability[1] | Sample | | |
| --- | --- | --- | --- |
| | 1 | 2 | 3 |
| Ammonium plastic 5 | 0.40 | 0.09 | 0.16 |
| Ammonium plastic 7.5 | 1.44 | 1.32 | 0.76 |
| Ammonium plastic 10 | 0.23 | 0.28 | 0.02 |
| Ethylene vinyl alcohol (EVOH)[2] | 0.004-0.06 | | |
| Polyethylene terephthalate (PET)[2] | 1.6 | | |
| Nylon 66 (PA 66)[2] | 2.0 | | |
| Polypropylene (PP)[2] | 82 | | |

[1]$(mm * ml)/(m^2 * 24 h)$
[2]Permeability and other film properties, ISBN 1-884207-14-6 William Andrew Inc., 1995

Figure 4:
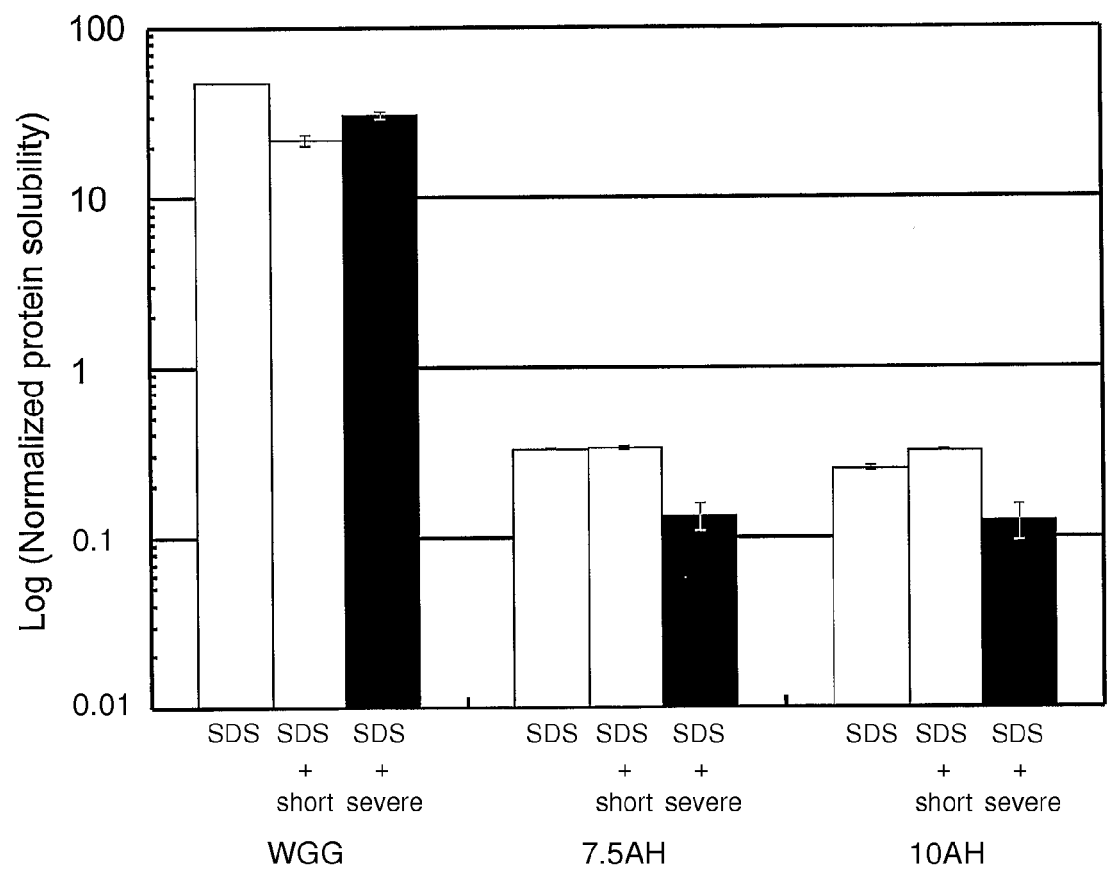
FIG. 4 depicts the protein solubility of samples exposed to SDS, SDS+short sonication (SDS+short) and SDS and severe sonication (SDS+severe). The values are normalized with respect to the solubility of a gluten/glycerol film (WGG).

In the WG film extrudates with ammonium hydroxide, the proteins seemed to be polymerized to a significantly greater extent than was the case for the previously extruded WG films. HPLC revealed only a very small fraction of soluble proteins after sodium dodecyl sulphate (SDS) extraction alone, or in combination with sonication (FIG. 4). SDS normally unwinds the protein chains and sonication is considered to extract proteins through mechanical scission of disulfide bonds; consequently the aggregated proteins were not possible to unwind in the normal way, nor did any mechanical scission of disulfide bonds cause protein molecules to disentangle and dissolve. The only proteins that were extracted were of omega gliadin type (FIG. 5). Even with further extraction using SDS and DTT (1,4-dithio-DL-threitol) the proteins were not readily dissolved. The extrudate dissolved completely first after the addition of urea, together with SDS and DTT, and heat treatment. Thus the latter very tough treatment, which does not destroy the protein network by attacking preferentially/only the disulfide bonds, were, in contrast to the sonication and DTT techniques, efficiently dissolving the ammonium-hydroxide WG. This, in turn, indicated that the protein network of the aggregated protein was stabilized by crosslinks of other types than just disulfide bonds. It may be speculated that these were isopeptide bonds. Still, the fact that the omega gliadins were extracted already at the first extraction steps suggest that intermolecular disulfide-bonds were also present and of importance for the protein network stability. The reason for the high solubility of omega gliadins, relative to other gliadins, was probably a consequence either of their low sulphur (disulfide) content or of their more thermo-resistant behaviour in comparison with the rest of the proteins.

In relation to other types of biopolymer films, films of the current invention show high strength and low oxygen permeability. The strength of 5.8±0.4 MPa at a 37±5% strain at break for a material containing 30 wt. % glycerol are in range with or superior to other protein materials. The AH oxygen permeabilities (Table 1) could be compared favourably with these of oriented polyethylene terephthalate or Nylon 66.

It has been disclosed herein how to produce, on a continuous basis with conventional thermoplastic processing techniques, e.g. extrusion, high quality plastics based on e.g. vital wheat gluten. The dense readily fused material is translucent, strong, yet extensible, with a high oxygen barrier. Thus, it has properties interesting for most in-door flexible-to-stiff plastic applications. As compared to conventional wheat gluten materials the described material according to the invention seems to leak, in relative terms, less of the proteins responsible for celiac disease and wheat gluten allergy. Only omega-gliadins was extracted, a finding which opens up for future use of wheat gluten in e.g. medical or food-packaging applications.

Methods

Materials.

Wheat gluten powder was supplied by Reppe A B, Lidköping, Sweden. The powder consisted of 84.8 wt % wheat gluten proteins, 8.1 wt % wheat starch, 5 wt water, 1.34 wt % fat, and 0.76 wt % ash. Glycerol with a purity of 99.5% was supplied by Karlshamns Tefac A B, Karlshamn, Sweden. Ammonium hydroxide solution (33%) and Rhodamine B was obtained from Sigma Aldrich. Salicylic acid (SA) (99%) was obtained from VWR International.

Processing.

The glycerol and ammonium hydroxide were mixed and then blended with the wheat gluten and salicylic acid as described by Ullsten at al.[1] The WG sample contained only gluten and glycerol whereas the AH5, AH7.5 and AH10 contained 1.5 wt. % SA and 5, 7.5 and 10 wt % ammonium hydroxide, respectively. The mixtures were pelletized and extruded in an Axon BX12 single screw extruder, equipped with a 45×0.7 $mm^2$ flat sheet die.[1] The extruder temperature profile, from the die to the hopper, was 120-65-60-40° C. and the screw speed was 200 rpm.

Scanning Electron Microscopy (SEM).

Small pieces of gluten plastic and ammonium plastic* were placed on stubs with double-sided tape and sputter-coated with gold-palladium (3:2). Samples were viewed immediately in SEM (LEO 435VP) with secondary electron detector at high voltage of 10 kV.

Proteine Labeling.

10 g of freeze-dried wheat gluten protein was dyed with 500 ml 0.02% (w/v) rhodamine solution for 6 h. The protein solution was dialyzed in purified water for 10 days and then freeze-dried. The labeled protein was mixed with pure wheat gluten powder, ratio 1:350, and then mixed and extruded as described earlier.

Confocal Laser Scanning Microscopy (CLSM).

The rhodamine-treated samples were placed on object slides with glue. Water was added on the sample prior to optical scanning at confocal microscope (LSM 510 META/Zeiss) with water immersion objective Achroplan 20x/0.5 W Ph2 at an excitation wavelength of 543 nm. About 40 optical sections representing approximate thickness of 125 µm were combined to the intensity diagrams showing distribution of rhodamine labeling.

Tensile Tests.

Tensile tests was performed at 50% RH and 23° C. using a ZwickZ010 tensile tester controlled by testXpert 7.1 computer program, from Zwick GmbH & Co, Germany. Dumbell shaped specimens were punched out from the wheat gluten film along the extrusion direction, with a length and width of the narrow section of 16 mm and 4 mm, respectively. The measurements were performed as described in ASTM D 882-02 with a crosshead speed of 100 mm/min and clamp distans of 40 mm. 10 replicates of each sample were tested.

Oxygen Permeability.

The oxygen transmission rate was determined in accordance with ASTM D 3985-95, at 23° C. and 0% RH, using a Mocon Ox-Tran 2/20, from Modern Controls Inc., MN, USA. The test pieces were mounted in isolated diffusion cells and subsequently purged with nitrogen gas (2% hydrogen) in order to measure the background oxygen leakage of the instrument. Each specimen was tightly sandwiched between two aluminium foils so that an area of 50 $cm^2$ was exposed for the measurements. One side of the sample was exposed to flowing oxygen (99.95%) at atmospheric pressure. The oxygen transmission rate was normalized with respect to the oxygen pressure and the film thickness to yield the oxygen permeability. Three replicates from each sample were used.

Protein Solubility.

Protein composition and solubility in the films was investigated using the three-step extraction procedure followed by size-exclusion high-performance liquid chromatography (SE-HPLC), developed in Gällstedt et al.[7] Proteins soluble in dilute sodium dodecyl sulfate (SDS) were extracted in the first step, proteins soluble in SDS after a short sonication were extracted in the second step, and additional proteins were extracted in SDS with repeated sonication.

Reversed-Phase High-Performance Liquid Chromatography (RP-HPLC).

After the third step of protein extraction for SE-HPLC, the pellet was collected for further protein extraction. This extraction/digestion was carried out in three steps (extractions 4-6).[6] Protein fractionation was carried out using RP-HPLC on a Waters HPLC-system with a Discovery BIO Wide Pore C8 column (Supelco) having a 5 µm particle size as described by Ullsten et al.[6]

Protein Separation by SDS-PAGE.

Proteins were extracted in three steps (extraction 1-3) and separated by SDS-PAGE in accordance with Ullsten et al.[6]

REFERENCES (1) Ullsten, N. H.; Gällstedt, M.; Johansson, E.; Gräslund, A.; Hedenqvist, M. S., Biomacromol 2006, 7, 771-776.
(2) Pommet, M.; Redl, A.; Morel, M.-H.; Guilbert, S. Polymer 2003, 44, 115-122.
(3) Redl, A.; Morel, M. H.; Bonicel, J.; Vergnes, B.; Guilbert, S. Cereal Chem. 1999, 76 (3), 361-370.
(4) Kokini, J. L.; Ho, C. T.; Karwe, M. V., Eds., Food extrusion and technology, Marcel Dekker New York, 1992.
(5) Micard, V.; Morel, M.-H.; Bonicel, J.; Guilbert, S. Polymer 2001, 42 (2), 477-485.
(6) Ullsten, N. H.; Gällstedt, M.; Cho, S.-W.; Johansson, E.; Hedenqvist, M. S., Properties of plasticized vital wheat gluten sheets with sodium hydroxide and/or salicylic acid. Under revision, Biomacromolecules 2008.
(7) Gällstedt, M.; Mattozzi, A.; Johansson, E.; Hedenqvist, M. S., Biomacromol. 2004, 5, 2020-2028.

The invention claimed is:

1. A method of producing a film comprising the steps of:
   (a) providing a plant protein;
   (b) treating said protein with a composition comprising a nitrogen-containing compound selected from the group consisting of ammonium hydroxide, ammonia, a quaternary ammonium salt, urea, and salmiak; and
   (c) extruding said film;
wherein the method does not comprise the use of a solvent and wherein the film has oxygen barrier properties.

2. The method according to claim 1, wherein the composition in step (b) further comprises an anti-oxidative or radical scavenging compound.

3. The method according to claim 1, wherein the plant protein in (a) is from a plant selected from the group consisting of wheat, corn and soy.

4. The method according to claim 2, wherein the anti-oxidative or radical scavenging compound of (b) is selected from the group consisting of salicylic acid, hindered phenols, amines, vitamins, scorch retarding compounds, other radical scavengers and antioxidants.

5. The method according to claim 1, wherein said film has an oxygen permeability<4 $(mm*ml)/m^2 24\ h)$.

* * * * *

UNITED STATES PATENT AND TRADEMARK OFFICE
CERTIFICATE OF CORRECTION

| | | |
|---|---|---|
| PATENT NO. | : 8,652,600 B2 | Page 1 of 1 |
| APPLICATION NO. | : 13/119158 | |
| DATED | : February 18, 2014 | |
| INVENTOR(S) | : Mikael Gallstedt | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 196 days.

At page 1 Item (56), column 2, line 29, under Other Publications, please change "Salicyclic" to --Salicylic--.

In the Specification

At column 1, line 39, please change "cystein" to --cysteine--.

At column 3, line 43, please change "rhodamin," to --rhodamine,--.

At column 5, line 11, please change "5 wt" to --5 wt %--.

At column 5, line 20, please change "Ullsten at al.[1]" to --Ullsten et al.[1]--.

At column 5, line 34, please change "Proteine" to --Protein--.

At column 5, line 53, please change "Dumbell" to --Dumbbell--.

At column 5, line 58, please change "distans" to --distance--.

At column 6, line 38, please change "Dekker" to --Dekker:--.

Signed and Sealed this
Sixth Day of January, 2015

Michelle K. Lee
*Deputy Director of the United States Patent and Trademark Office*